June 15, 1954  C. K. BROWN, JR., ET AL  2,681,171
BOX LOADING AND CONVEYING MACHINE
Filed Nov. 30, 1951  5 Sheets-Sheet 1
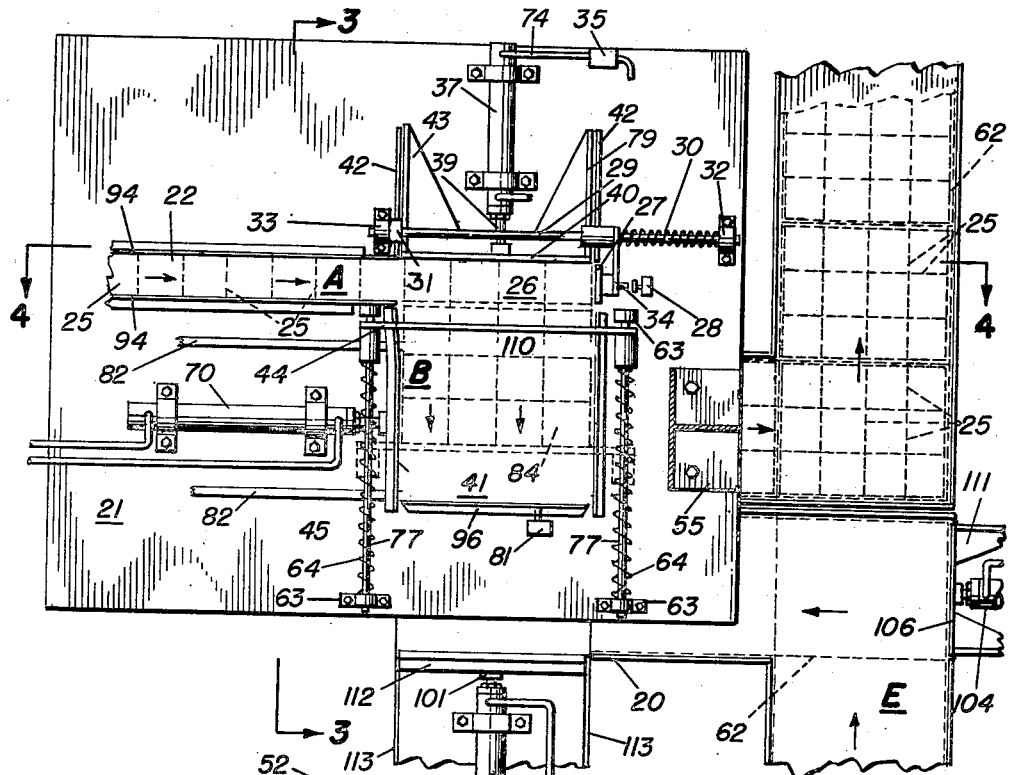
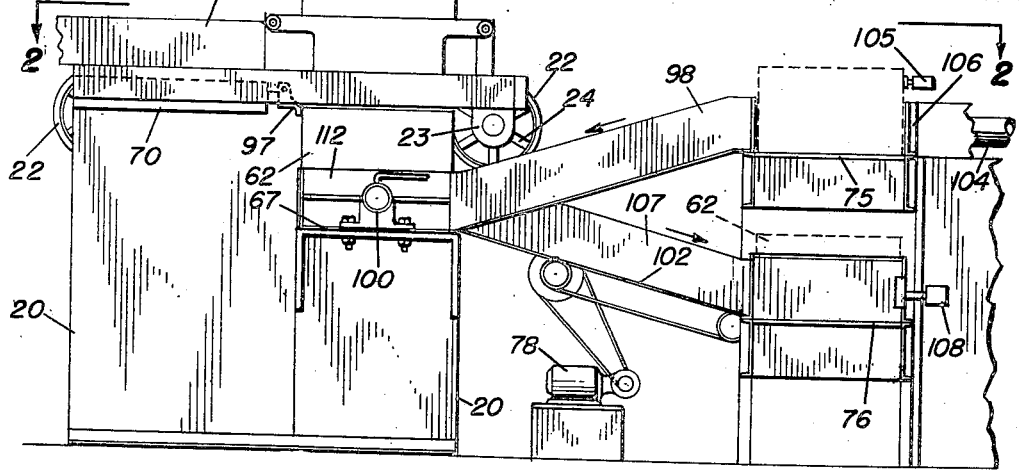
FIG. 1
INVENTOR.
CHARLES KEPLER BROWN, JR.
GENE C. SMITH
BY Howard J. Whelan
ATTORNEY INVENTOR.
CHARLES KEPLER BROWN, JR.
GENE C. SMITH
BY Howard J. Whelan.
ATTORNEY INVENTOR.
CHARLES KEPLER BROWN, JR.
GENE C. SMITH
BY Howard J. Whelan
ATTORNEY June 15, 1954

C. K. BROWN, JR., ET AL 2,681,171

BOX LOADING AND CONVEYING MACHINE

Filed Nov. 30, 1951

INVENTOR.
CHARLES KEPLER BROWN, JR.
GENE C. SMITH

BY *Howard J. Whelan*

ATTORNEY

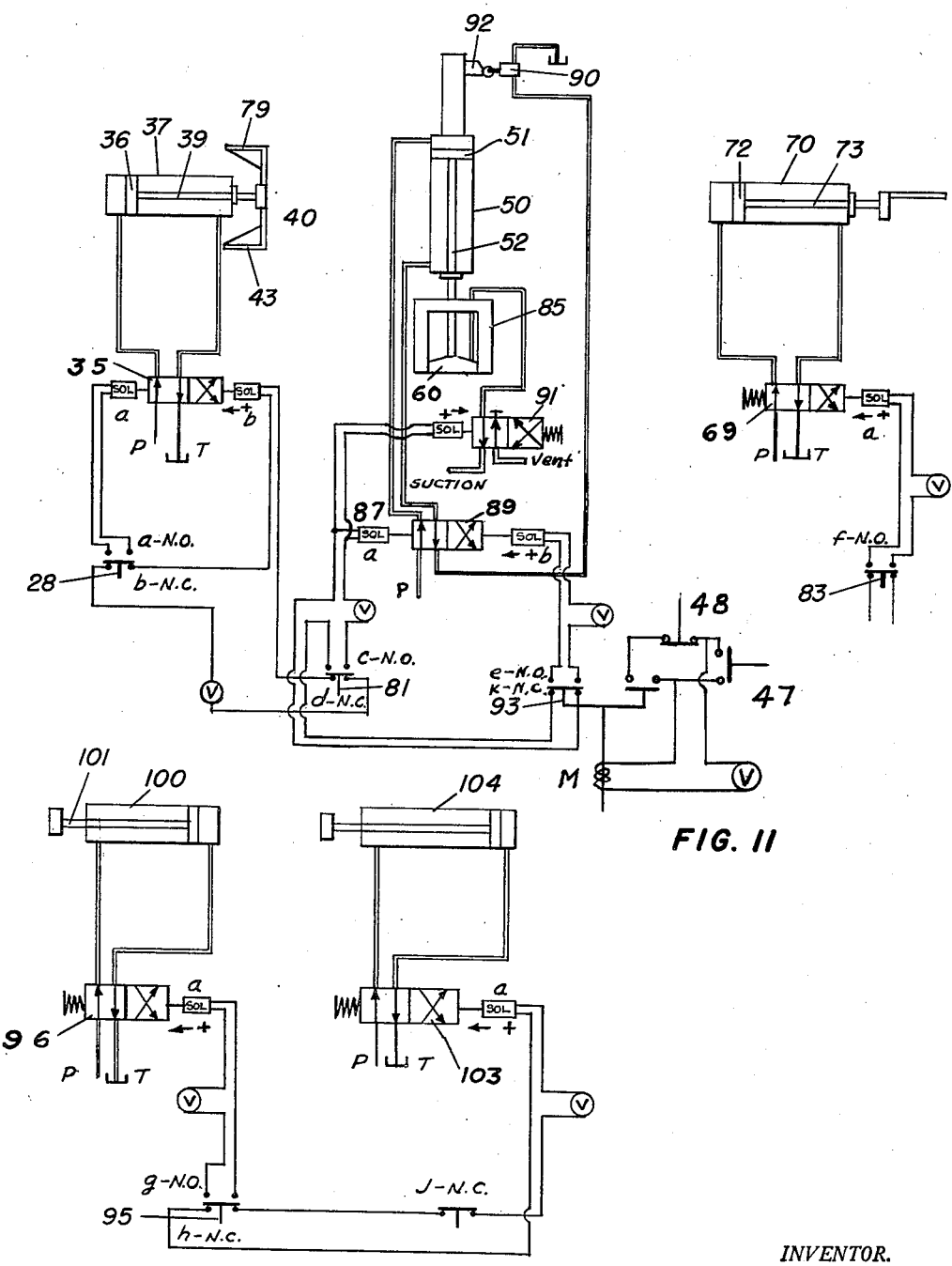

Patented June 15, 1954

2,681,171

UNITED STATES PATENT OFFICE 2,681,171

BOX LOADING AND CONVEYING MACHINE

Charles Kepler Brown, Jr., and Gene C. Smith, Fairmont, W. Va., assignors to Robert E. Johnson, Charleston, W. Va.

Application November 30, 1951, Serial No. 259,098

4 Claims. (Cl. 226—14)

This invention relates to packaging machines and more particularly to those intended for the placement of articles that have been packaged so that they will be boxed and carried off in predetermined quantities ready for delivery purposes.

It is customary in the marketing of milk in cardboard cartons to employ a filling machine first, for pouring the liquid into the containers which are then closed and sealed in a conventional manner. Then the filled containers are placed on a conveyor and carried to a table where they accumulate until an operator picks them up manually and deposits them in boxes ready for delivery. In this invention the matter of manually handling the containers is replaced by an automatic mechanical method of doing the same thing. This is preferably performed by a series of contact plates and switches which operate the various equipment when the filled containers approach appropriately, to displace them in sets of predetermined quantity on a suitable shelf and load them by vacuum cups attached to a head and then place them into a delivery box ready for distribution.

One of the objects of this invention is to provide a new and improved container loading machine that will avoid some of the disadvantages and limitations of the prior art.

Another object of the invention is to provide a new and improved container loading machine that will provide for the automatic arrangement of the containers in predetermined quantities and their movement thereafter, with means to lower them from one plane to another in a convenient and effective manner.

A further object of this invention is to provide a new and improved container loading machine suitable for handling milk in cartons, that will provide for the diversion of the filled cartons in predetermined sets or groups, that can be moved as a unit to a lowering mechanism capable of suspending and depositing them in a delivery box ready to be taken away for distribution.

A further object of this invention is to provide a new and improved combined automatic box handling and container loading machine suitable for delivering empty boxes to a container loading section where they will be filled with containers and the filled box moved from the machine and another empty box positioned at the loading section ready to receive the containers.

Still another object of this invention is to provide a new and improved automatic container feeder, loader and delivery device operated by pressure fluid and vacuum heads in automatic sequence.

Other objects of the invention will be disclosed as the details are outlined more specifically in this application.

For a clearer understanding of the invention, reference is made to the accompanying drawings which together with the following description outline a particular form of the invention by way of example, not of limitation, while the claims emphasize the scope thereof.

In the construction shown in the drawings:

Figure 1 is a side elevation of a milk container loading machine and conveyor mechanism embodying this invention;

Figure 2 is a sectional plan view on line 2—2 of Figure 1;

Figure 11 is a diagram of the functional parts and connections of the machine.

Similar parts throughout the figures are designated by similar reference numerals.

Figure 3:
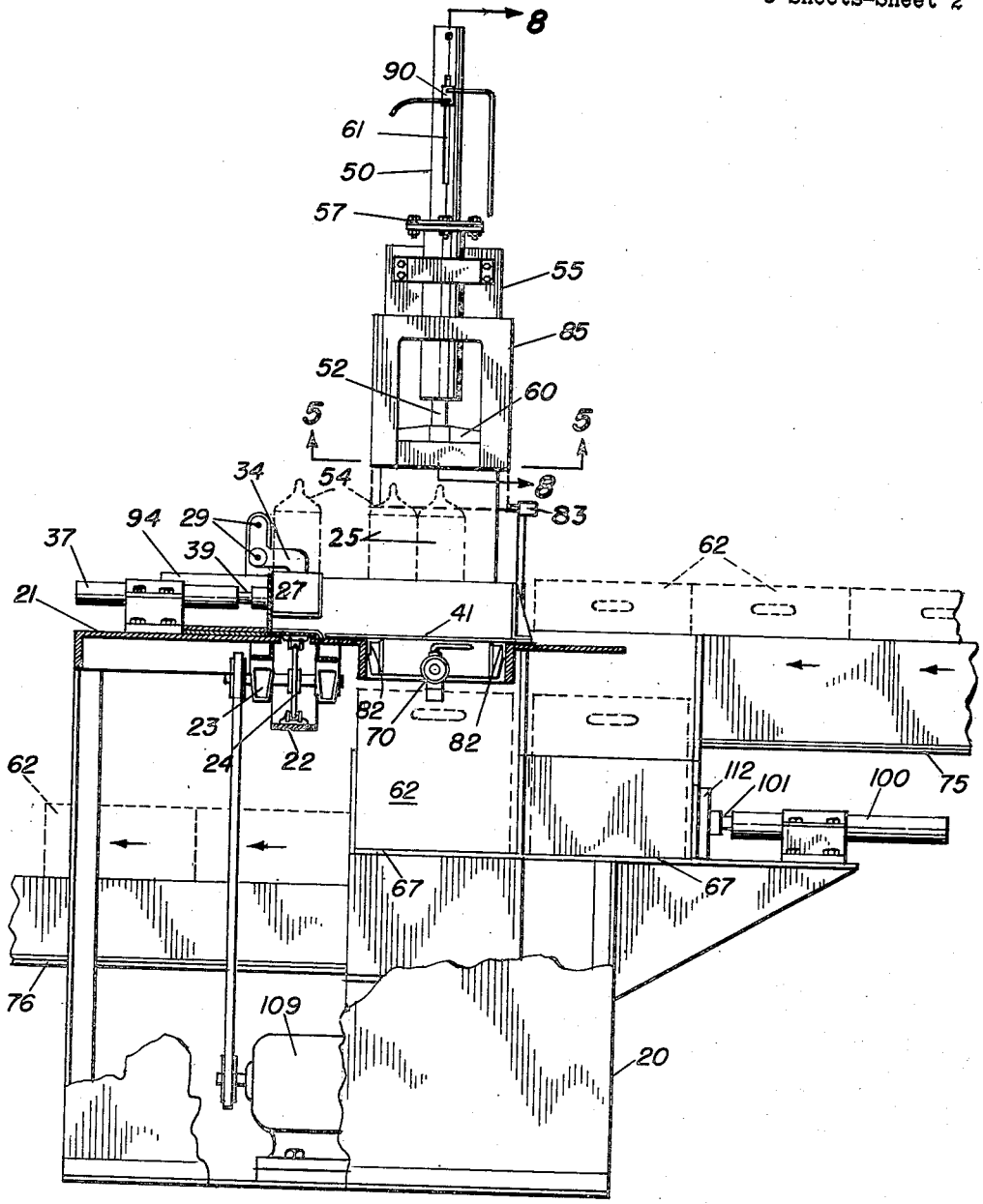
Figure 3 is a sectional elevation taken on line 3—3 of Figure 2, with portions partly broken away to show its inner construction.
Figures 4, 5, 6:
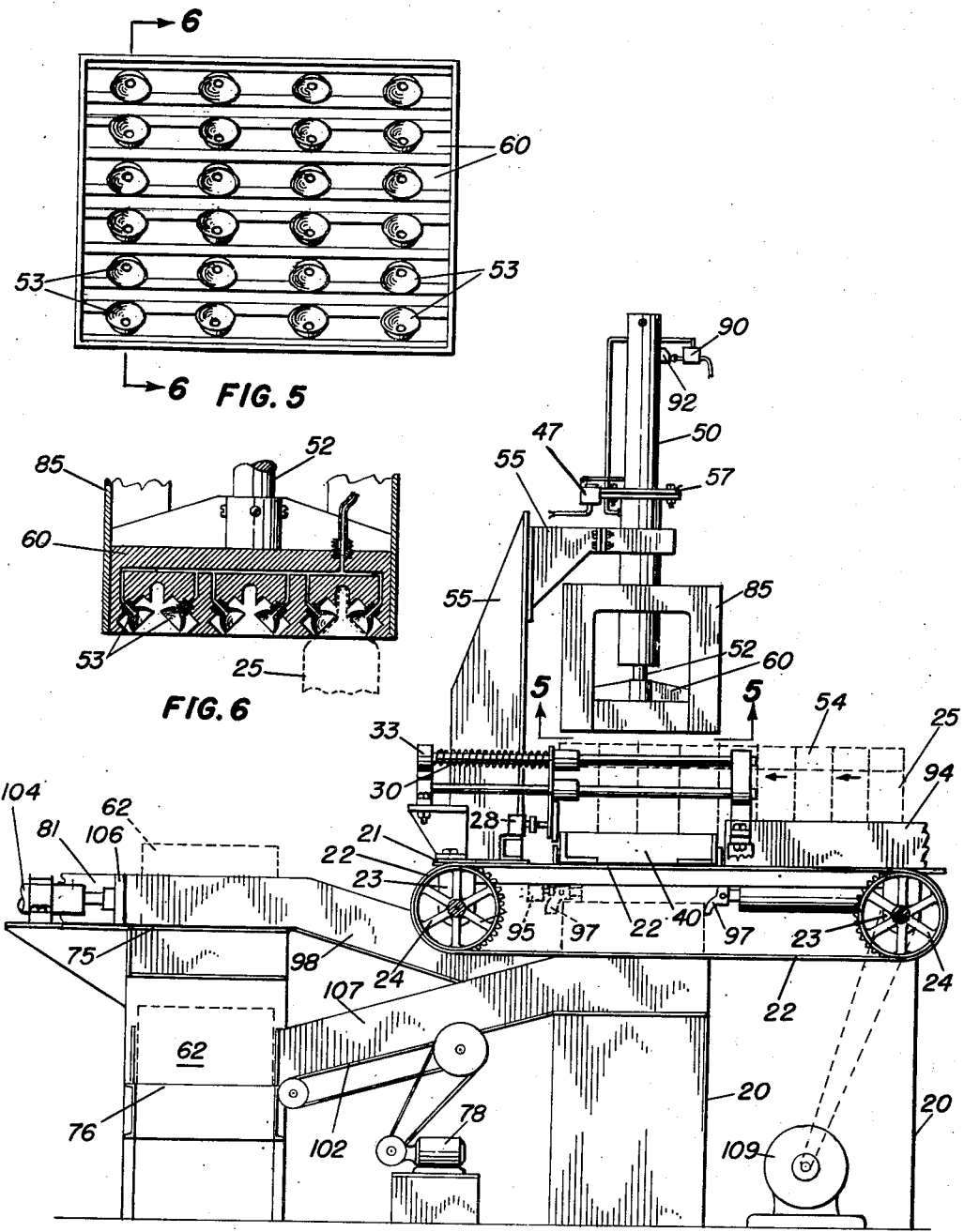
Figure 4 is a sectional side elevation taken on line 4—4 of Figure 2.
Figure 5 is an upward view of the container lowering head taken on line 5—5 of Figure 4.
Figure 6 is a sectional view taken on line 6—6 of Figure 5.
Figure 7:
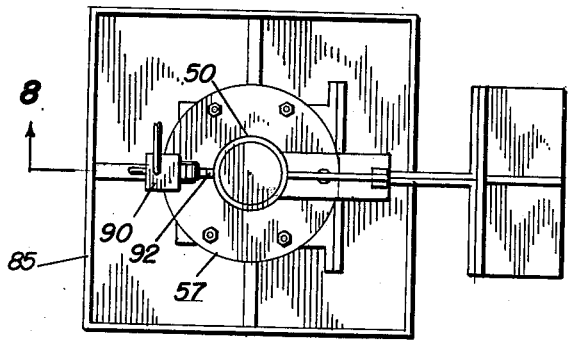
Figure 7 is a plan view of the container lowering mechanism used in this embodiment.
Figure 9:
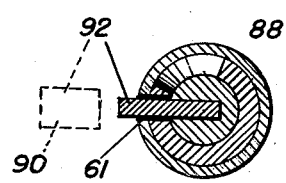
Figure 9 is a sectional view taken on line 9—9 of Figure 8.

The particular machine indicated in the accompanying drawings can be divided into the following functional divisions according to their sequential arrangement:

(A) The container servicing conveyor division. This brings the filled containers to the gathering area, getting them ready in a row, for bunching. It operates a switch after the full row is assembled in the gathering area to start the next step in the operations.

(B) The bunching division employs a pushing mechanism that moves each row of assembled containers from division (A), and consecutively piles them in rows on the collecting area 110 then on the dumping shelf until there are enough rows to cover it. The pushing mechanism is provided with a wing-cut-off plate 43 to hold back the following containers 25 on the conveyor so that they will not enter the gathering area and be in the way of the pusher during its travel. The containers contact a retarder plate which is pushed back by the containers until it reaches the end of the stroke and automatically throws a switch to close a circuit controlling the loader and dumper shelf as described later.

(C) The loading division takes the containers assembled on the dumping shelf and after moving this shelf to disclose an opening in the framework, places them in the box used for distributing them. This involves a loading head provided with vacuum cups that are attached to each individual container and holds them suspended while the shelf is being withdrawn from under them and moved out of the way. The loading head then lowers the containers into the box positioned below the opening and releases them. The loading head and shelf automatically return to their starting positions. All this is done through the use of switches and valves operated by the mechanism as the latter moves into its different positions.

(D) The box delivery division involves a combination of operations with its main purpose intended to move the loaded box of containers out of the way and place it on a secondary conveyor that takes it to the distribution or stock piling area. The mechanism of this division is actuated through switches and valves by the loading mechanism (C) when it reaches a predetermined point in its loading of the box. At that point the loading head is raised up out of the way and the shelf is returned slowly while engaging the filled box and sliding it off the platform on which it rests, to the secondary conveyor.

(E) The empty box delivery division includes a conveyor and the mechanism that pushes another empty box on to the platform under the loader so that it will be ready for the next load of milk filled containers, and it operates after the previous filled box is conveyed away as noted in (D). This is arranged for through the use of switches and valves controlled by the movements from the other sections, and actuating at predetermined points in their travels.

The details of these various divisions are outlined in the following descriptions. It is however to be understood that the correlation of operations and parts does not allow for a clear demarcation of divisions from each other, and in some instances, the purpose of the separation into divisions is to provide a less complicated picture of the complete invention, than would be possible if they were not so divided.

The structure indicated in the drawings is that adapted for use in the loading operations of filled milk containers into shipping boxes automatically. It is built with a framework 20 arranged for holding the different parts and mechanisms employed in the use of the machine, together with all necessary openings, slots and formations desirable for the assembly and operations involved. It has a flat upper surface termed the table 21 serving as the primary working plane of the equipment.

*Container servicing conveyor mechanism*

This division of the machine consists of a conventional belt or plate container conveyor 22, carried on sprocket wheels 24 mounted on shafts with their ends supported in bearings 23 on the framework 20 and its plates are preferably aligned horizontally with the upper surface of the table. The conveyor is driven by the motor 109. The milk filled containers 25 are placed on the plates or belt of the moving conveyor and carried across the table from one side to the other by frictional contact therewith. There are guide walls 94 erected on the table at the sides of the conveyor to keep the containers properly aligned and protected against overturning laterally. The containers proceed in a single line on the conveyor across the table, with the first one of the line pressing against a bumper pad 27 and forcing it along until a predetermined number of containers are collected in the gathering area 26. The bumper pad 27 is slidably held on horizontal rods 29 and tensioned by spring 30. The rods 29 are supported on journals 32 and 33 and provided with an adjustable collar 31 to limit the forward travel of the bumper pad 27. When the pad 27 is moved over to the end of its travel under the pressure exerted by the containers 25, a lug 34 attached to the pad contacts and closes the "A" contacts of switch 28 and energizes the "A" solenoid which operates valve 35 and pushes the pusher bar 40 (B-bunching division) forward to remove the containers 25 from the conveyor 22 and places them off to one side of the conveyor a distance slightly in excess of the width of the container. When the containers 25 clear the end of the pad 27 the pusher bar 40 extends until it comes to rest against control plate 79 and allows the "A" contacts of the switch 28 to open and the "B" contacts to close. This switch action de-energizes solenoid "A" and energizes solenoid "B" of valve 35 and reverses the hydraulic action of cylinder 37 and pulls the pusher bar 40 back so it will clear the conveyor 22. Thus allowing another group of containers to enter the gathering area 26 until they contact the bumper plate 27 and shove it back far enough to contact the switch 28 and close its contacts "A" etc. to repeat the cycle just described a predetermined number of times until the removable dump shelf 41 is filled with containers and retarder plate 44 makes contact with switch 81, closing its "C" contacts, energizing "A" solenoid of valve 89, and opening "D" contacts holding "B" solenoid of valve 35 de-energized to prevent further action of cylinder 37 for a predetermined amount of time. The pusher bar 40 is fitted with a cut-off plate 43 to prevent the containers 25 remaining on the conveyor from passing in the back of the pusher bar 40 when it is extended during the movement of the containers from the conveyor to the dump shelf 41. The retarder plate 44 is slidably mounted on guide rods 77 which are supported in bearings 63 and the plate is returned to its starting position by springs 64 when the head 60 is raised out of box 62. The loading mechanism "C" consists primarily of a lowering and raising cylinder 50, supported on a bracket 55. It has a piston 51, operating a piston rod 52 and a rectangular vacuum cup holder or loading head 60, together with switches, valves, electrical circuits and pipe lines. The holding head 60 supports in this instance twenty four vacuum cups 53 adapted to conform to the shape of the tops 54 of the containers 25, which cups fit closely thereon and provide a good vacuum fit against leakage, and have enough suction to support the weight of the filled containers 25, when the dump shelf 41 has been withdrawn. The vacuum cup loading head operates as follows. The energization of "A" solenoid of valve 89 causes cylinder 50 to lower the vacuum cup loading head 60. The deacceleration valve 90 causes the lowering motion to be slow and gentle until the vacuum cups 53 contact the tops of the filled containers 25. This lowering action causes the operation of a switch 83 which energizes "A" solenoid on valve 69, causing the rapid retraction of the dump shelf 41 from under the grouped containers and solenoid on vacuum valve 91 causing the vacuum cups 53 to hold the containers so they may be lowered into the delivery boxes 62. At this point of the stroke the de-accelerating cam 92 has cleared the de-acceleration valve and allows the grouped containers to be lowered speedily into the box 62. When the guard plate 85 (see Fig. 3) holds switch 83 closed the valve 69 is operated, and the dump cylinder 70 retracts and switch 81 is held closed, until the loading head 60 is raised up from depositing the containers in the box 62 and returns to its original starting position. The vacuum is broken by operation of switch 47 (thru valve 91) when the containers reach the bottom of the box 62 and are resting on a platform 67. The retraction of the head 60 is accomplished by the operation of contactor 93 thru the closing of 47. The operation of the contactor 93 opens contacts "K" and de-energizing solenoid "A" on valve 89 and closing contacts "E" energizing solenoid "B" on valve 89, forcing oil into the bottom of cylinder 50 and causing the head 60 to be raised to its starting position where N. C. switch is momentarily opened to reset contactor 93, closing contacts "K" preparatory to the next cycle and opening contacts "E" also. The shelf 41 is provided with a dog 97 pivoted to engage the side wall of the box 62 and push it off the platform 67 when the shelf 41 is returned to the position closing the grouping area opening 84 and positioning it to receive the oncoming containers 25. The dump shelf 41 is supported and guided by channels 82 suitably located on the table 21. The cylinder 70 is mounted on the framework 20 and is arranged so that the shelf slides back over it when it uncovers the opening 84. The movement of this shelf is synchronized so that it will be positioned ready to receive the oncoming containers as they are pushed over towards it.

The retraction of cylinder 50 also allows switch 83 to open, causing the spring off-set valve 69 to reverse cylinder 70 to replace the shelf 41 back under the grouping area and shove the loaded box 62 off the platform 67 out onto chute 107 of the box feeding conveyor. The withdrawal or raising of guard plate 85 allows the retarding plate 44 to move towards the gathering area 26 at the same time releasing switch 81, closing "D" contacts therein and causing the op-operation of solenoid "B" of valve 35 to retract pusher bar 40 to repeat the gathering and grouping cycles previously described.

The box receiving division (E) and delivery division (D) mechanisms consist of the empty box receiving conveyor 75 and the filled box delivery conveyor 76 and are used to deliver the empty boxes 62 by conveyor 75 to an angular chute 98 which delivers the empty boxes to the platform 67 where they are filled with containers 25 and removed by the latch dog 97 and slid down the chute 107 until they meet the belt conveyor 102 and are carried away by conveyor 76 to the stock piling area. The empty boxes 62 are carried to a discharge pusher 106 positioned in the conveyor 75 and operated by a cylinder 104. The pusher 106 is provided with cut-off plates 111 and pushes the empty boxes 62 down the chute 98 to a position in front of box moving positioner 112 and is operated by cylinder 100 which then shoves the boxes into position under the dump shelf 41 and raised loading head 60. The belt conveyor 102 runs as long as the lower conveyor 76 is clear of containers in the critical area where the switch 108 is located, and the switch is normally "closed" to keep the conveyor running and will be held "open" by the loaded containers piling up against it to stop the motors 78 and 109 and conveyors 76 and 102 whose rubber belts act as a brake to prevent the loaded container from entering the lower conveyor 76 until the containers in the danger area around switch 108 have passed on to the stock piling area. The switching cycle used in feeding the container to the container loader and away to the stock piling area can be preferably as follows: When the shelf 41 is under the containers the latch dog 97 contacts the switch 95 and closes its contacts "G" and operates valve 96 to extend cylinder 100 which through its positioner 112 pushes box 62 onto the loading platform 67 and maintains pressure against the container 62 until switch 83 closes "F" and makes contact operating valve 69 which retracts shelf 41 and opens contacts "G" which allows cylinder 100 to retract and close contacts "H" which causes valve 103 to operate (providing a box is in the right place on conveyor 75 to allow the arm of the switch 105 to fit in the hand hole of box 62 and close the switch and the circuit connected thereto) and extending cylinder 104 and discharge pusher 106 to push a container 62 off of conveyor 75 and down chute 98 into opening created by the retraction of positioner 112 and cylinder 100. Retraction of cylinder 50 causes switch 83 to open de-energizing solenoid of valve 69, allowing spring off set to operate the valve so as to extend cylinder 70, shoving the loaded box 62 out onto the chute 107, at which time contacts "H" is opened to de-energize solenoid of valve 103 causing the reversal of valve 103 and retracting cylinder 104. The closing of contacts "G" of switch 95, starts the box loading cycle again by energizing valve 96, extending cylinder 100 to shove an empty box into loading position.

Figure 8:
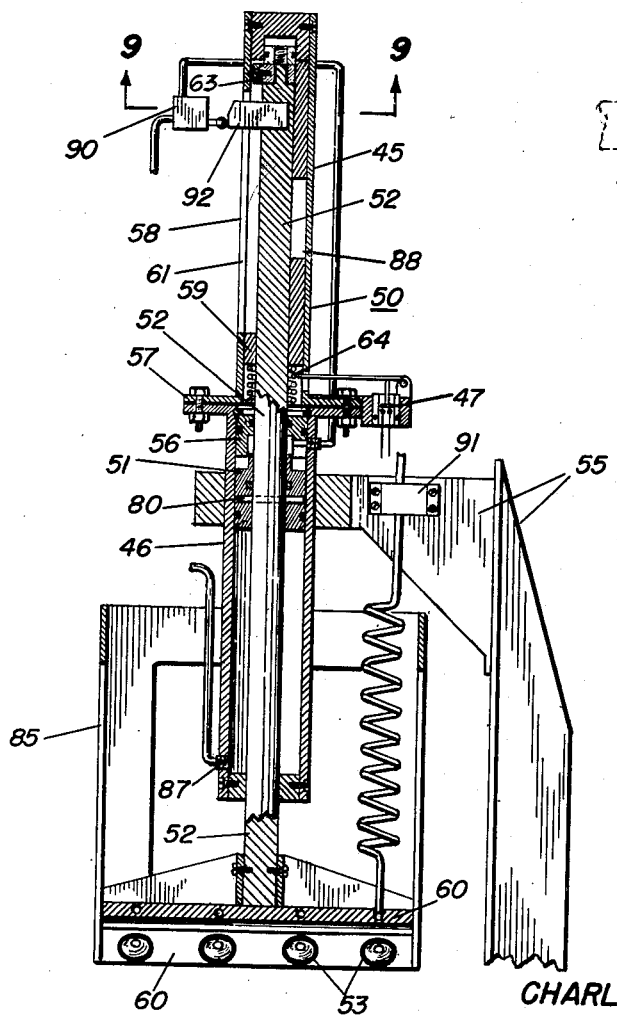
Figure 8 is a sectional view taken on line 8—8 of Figure 7.
Figure 10:
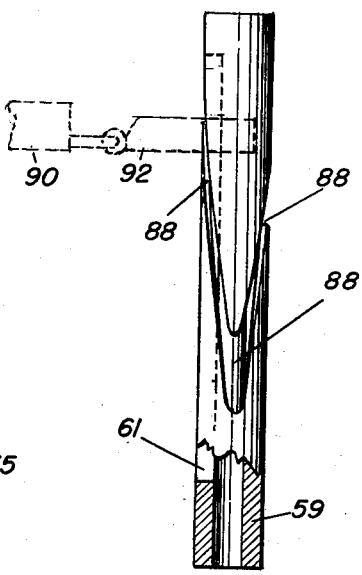
Figure 10 is an elevation, partly in section, of a depth control sleeve used to control the travel of the vacuum head into the delivery box.

In Figure 8, the details of the construction of the lifting cylinder are shown. The cylinder 50 is in two sections, the upper 45 houses the mechanism for lowering and raising the head 60. The lower section 46 is the cylinder proper and includes the piston 51 and piston rod 52. The piston is pinned to the rod 52 at 80 so they will move together. A cylinder head 56 separates the lower and upper sections from each other. Flanges 57 suitably bolted together hold the sections. The upper section consists of a casing 58 spaced from the piston rod 52 with a shell member 59 in between. This shell is grooved at 61 to form a path in which a projecting cam element 92 can reciprocate. This cam element 92 operates the valve 90 and hydraulic line to the cylinder to push the piston down slowly at first, then faster until it reaches the end of stroke. The connection 87 at the lower portion of the lower section 46 is employed to raise the piston to its starting position. The cam shell member 59 is moved downwardly by the roller element 63 as the latter travels down in its spiral groove 88 and at the end of the stroke moves the cam shell 59 downwardly and operates the switch 47 attached to casing 58 so as to control the depth that the piston rod lowers the holder head 60 and incidentally the filled containers 25 into the box 62, and the release of the vacuum on the cups 53, and causes the head 60 to return to its starting position. A spring 64 tensions the cam shell member 59 upwardly to open switch 47 when the head 60 is in raised position. The cam shell member 59 has its groove 88 so designed that one or more levels of containers may be loaded in the same carton.

The machine is relatively simple in structure, but does its work effectively and automatically and is a great labor saver over present day equipment. It handles its items carefully and lessens the possibilities of breakage or spilling. Time is saved because the containers are handled in groups, as against the handling in singles customary with manual operation. Its structure is open to permit thorough sterilization and cleaning and all working parts are in plain sight.

While but one general form of the invention is shown in the drawings and described in the specification, it is not desired to limit this application for patent to this particular form, as it is appreciated that other forms of construction could be made that would use the same principles and come within the scope of the appended claims.

Having thus described the invention, what is claimed is:

1. A machine for the packaging of containers into boxes comprising in combination, a framework, a conveyor mounted on said framework, a table on the framework arranged to receive a series of containers deliverable thereto from said conveyor, a receiving plate on the table to receive the containers, a dump shelf aligned on the same plane with said plate in a horizontal plane and adapted to reciprocate in a horizontal plane, a pusher means mounted on said table and disposed so as to engage a plurality of said containers and move them on to said shelf, means for actuating said pusher means operated by the containers when they have reached a predetermined position on the plate, means for controlling the movement of the containers on said conveyor following the movement of a plurality of said containers engaged by said pusher means so they will be restricted from moving on to said plate during the period that said pusher means is actuated as aforesaid, means operated by said containers when they reach a predetermined position thereon for positioning said shelf in another secondary position, lowering means mounted on the table for securing said containers after they are pushed by said pusher means and holding on thereto so they will be suspended thereby when said shelf is in said secondary position, means for operating said lowering means so it will dispose the suspended container in predetermined positions out of alignment with said receiving plate, means for locating a delivery box on the framework so the suspended containers will be placed therein, control means for freeing said containers from said lowering means and setting them in said box, means for reversing said lowering means and returning the dump shelf into position in alignment with said receiving plate ready to receive another plurality of containers moved by said pusher means as aforesaid, guides on the table for effectively guiding said containers to the receiving plate and dump plate, chute means for the delivery of said box away from said table when the containers are placed therein, an auxiliary chute means for the placement of an empty box in said framework when the first mentioned loaded box is moved therefrom, fluid operated mechanism for operating said pusher means and dump shelf, electrically operated valves actuated by said containers when they reach predetermined positions thereon for controlling said mechanism.

2. A machine for the packaging of containers into boxes comprising in combination, a framework, a conveyor mounted on said framework, a table on the framework arranged to receive a series of containers deliverable thereto from said conveyor, a receiving plate on the table to receive the containers, a dump shelf aligned on the same plane with said plate in a horizontal plane and adapted to reciprocate in a horizontal plane, a pusher means mounted on said table and disposed so as to engage a plurality of said containers and move them on to said shelf, means for actuating said pusher means operated by the containers when they have reached a predetermined position on the plate, means for controlling the movement of the containers on said conveyor following the movement of a plurality of said containers engaged by said pusher means so they will be restricted from moving on to said plate during the period that said pusher means is actuated as aforesaid, means operated by said containers when they reach a predetermined position thereon for positioning said shelf in another secondary position, lowering means mounted on the table for securing said containers after they are pushed by said pusher means and holding on thereto so they will be suspended thereby when said shelf is in said secondary position, means for operating said lowering means so it will dispose the suspended containers in predetermined position out of alignment with said receiving plate, means for locating a delivery box on the framework so the suspended containers will be placed therein, control means for freeing said containers from said lowering means and setting them in said box, means for reversing said lowering means and returning the dump shelf into position in alignment with said receiving plate ready to receive another plurality of containers moved by said pusher means as aforesaid, guides on the table for effectively guiding said containers to the receiving plate and dump plate, chute means for the delivery of said box away from said table when the containers are placed therein, and auxiliary chute means for the placement of an empty box in said framework when the first mentioned loaded box is moved therefrom, fluid operated mechanism for operating said pusher means and dump shelf, electrically operated valves actuated by said containers when they reach predetermined positions thereon for controlling said mechanism, and conveyor means for distributing each box as it is delivered by said chute means.

3. A machine for the packaging of containers into boxes comprising in combination, a framework, a conveyor mounted on said framework, a table on the framework arranged to receive a series of containers deliverable thereto from said conveyor, a receiving plate on the table to receive the containers, a dump shelf aligned on the same plane with said plate in a horizontal plane and adapted to reciprocate in a horizontal plane, a pusher means mounted on said table and disposed so as to engage a plurality of said containers and move them on to said shelf, means for actuating said pusher means operated by the containers when they have reached a predetermined position on the plate, means for controlling the movement of the containers on said conveyor following the movement of a plurality of said containers engaged by said pusher means so they will be restricted from moving on to said plate during the period that said pusher means is actuated as aforesaid, means operated by said containers when they reach a predetermined position thereon for positioning said shelf in another secondary position, lowering means mounted on the table for securing said containers after they are pushed by said pusher means and holding on thereto so they will be suspended thereby when said shelf is in said secondary position, means for operating said lowering means so it will dispose the suspended containers in predetermined positions out of alignment with said receiving plate, and means for locating a delivery box on the framework so the suspended containers will be placed therein, control means for freeing said containers from said lowering means and setting them in said box, means for reversing said lowering means and returning the dump shelf into position in alignment with said receiving plate ready to receive another plurality of containers moved by said pusher means as aforesaid, guides on the table for effectively guiding the containers to the receiving plate and dump plate, chute means for the delivery of said box away from said table when the containers are placed therein, an auxiliary chute means for the placement of an empty box in said framework when the first mentioned loaded box is moved therefrom, fluid operated mechanism for operating said pusher means and dump shelf, electrically operated valves actuated by said containers when they reach predetermined positions thereon for controlling said mechanism, conveyor means for distributing each box as it is delivered by said chute means, said plurality of containers being delivered to the receiving plate in a single line until a predetermined number for a set are accumulated thereon, and then pushed on to said dump shelf consecutively in sets until a predetermined number are accumulated thereon to operate said lowering means, as aforesaid.

4. A machine for packaging of containers into boxes comprising in combination, a framework, a conveyor mounted on said framework, a table on the framework arranged to receive a series of containers deliverable thereto from said conveyor, a receiving plate on the table to receive the containers, a dump shelf aligned on the same plane with said plate in a horizontal plane and adapted to reciprocate in a horizontal plane, a pusher means mounted on said table and disposed so as to engage a plurality of said containers and move them on to said shelf, means for actuating said pusher means operated by the containers when they have reached a predetermined position on the plate, means for controlling the movement of the containers on said conveyor following the movement of a plurality of said containers engaged by said pusher means so they will be restricted from moving on to said plate during the period that said pusher means is actuated as aforesaid, means operated by said containers when they reach a predetermined position thereon for positioning said shelf in another secondary position, lowering means mounted on the table for securing said containers after they are pushed by said pusher means and holding on thereto so they will be suspended thereby when said shelf is in said secondary position, means for operating said lowering means so it will dispose the suspended containers in predetermined positions out of alignment with said receiving plate, and means for locating a delivery box on the framework so the suspended containers will be placed therein, control means for freeing said containers from said lowering means and setting them in said box, means for reversing said lowering means and returning the dump shelf into position in alignment with said receiving plate ready to receive another plurality of containers moved by said pusher means as aforesaid, guides on the table for effectively guiding said containers to the receiving plate and dump plate, chute means for the delivery of said box away from said table when the containers are placed therein, an auxiliary chute means for the placement of an empty box in said framework when the first mentioned loaded box is moved therefrom, fluid operated mechanism for operating said pusher means and dump shelf, electrically operated valves actuated by said containers when they reach predetermined positions thereon for controlling said mechanism, conveyor means for distributing each box as it is delivered by said chute means, said plurality of containers being delivered to the receiving plate in a single line until a predetermined number for a set are accumulated thereon, and then pushed on to said dump shelf consecutively in sets until a predetermined number are accumulated thereon to operate said lowering means, as aforesaid, and means for supporting the cartons against overturning incorporated in said pusher means.

References Cited in the file of this patent

UNITED STATES PATENTS

| Number | Name | Date |
|---|---|---|
| 1,243,407 | Hawthorne | Oct. 16, 1917 |
| 1,247,722 | Rogers et al. | Nov. 27, 1917 |
| 1,568,082 | Mitton | Jan. 5, 1926 |
| 2,358,447 | Creamer | Sept. 19, 1944 |